Aug. 13, 1963     F. P. REESE     3,100,651
STROLLER CHASSIS CHILD'S SUPPORT STRUCTURE
Filed Sept. 29, 1961     2 Sheets-Sheet 2
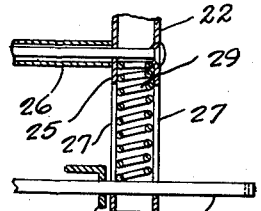
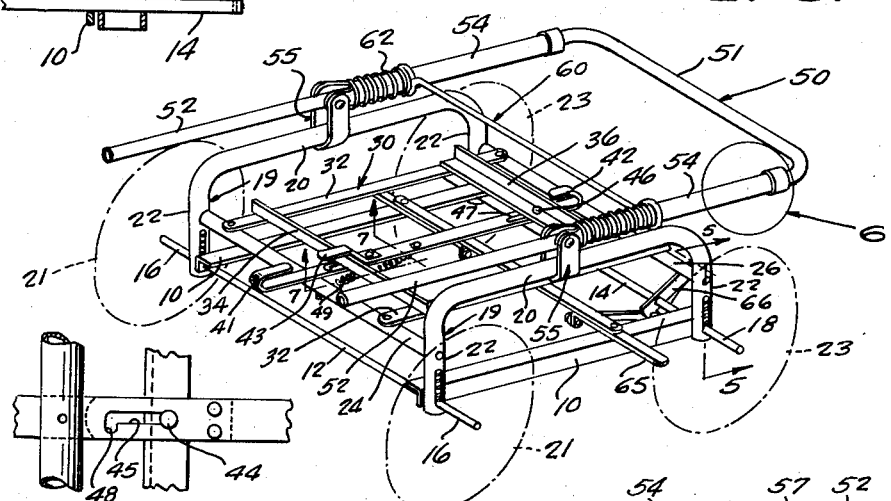
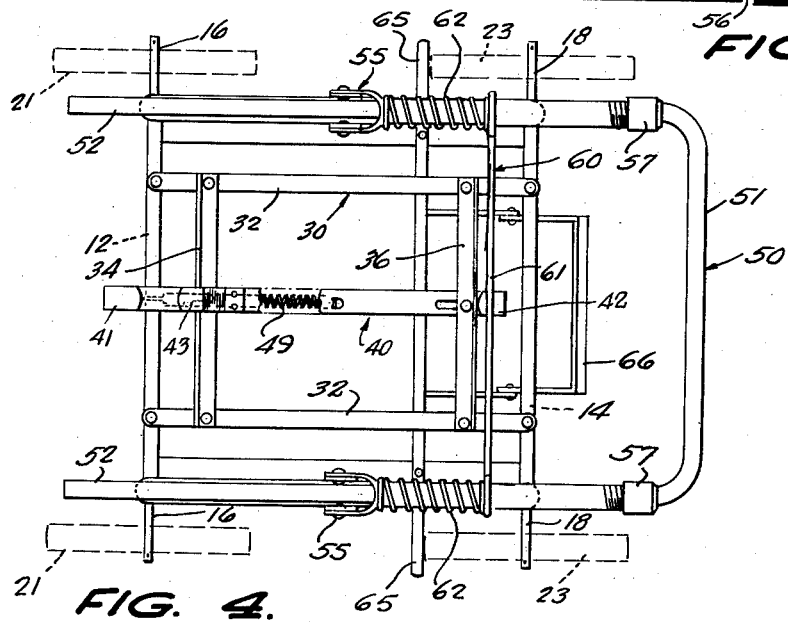
INVENTOR.
FRANK P. REESE,
BY
McMorrow, Berman + Davidson
ATTORNEYS.

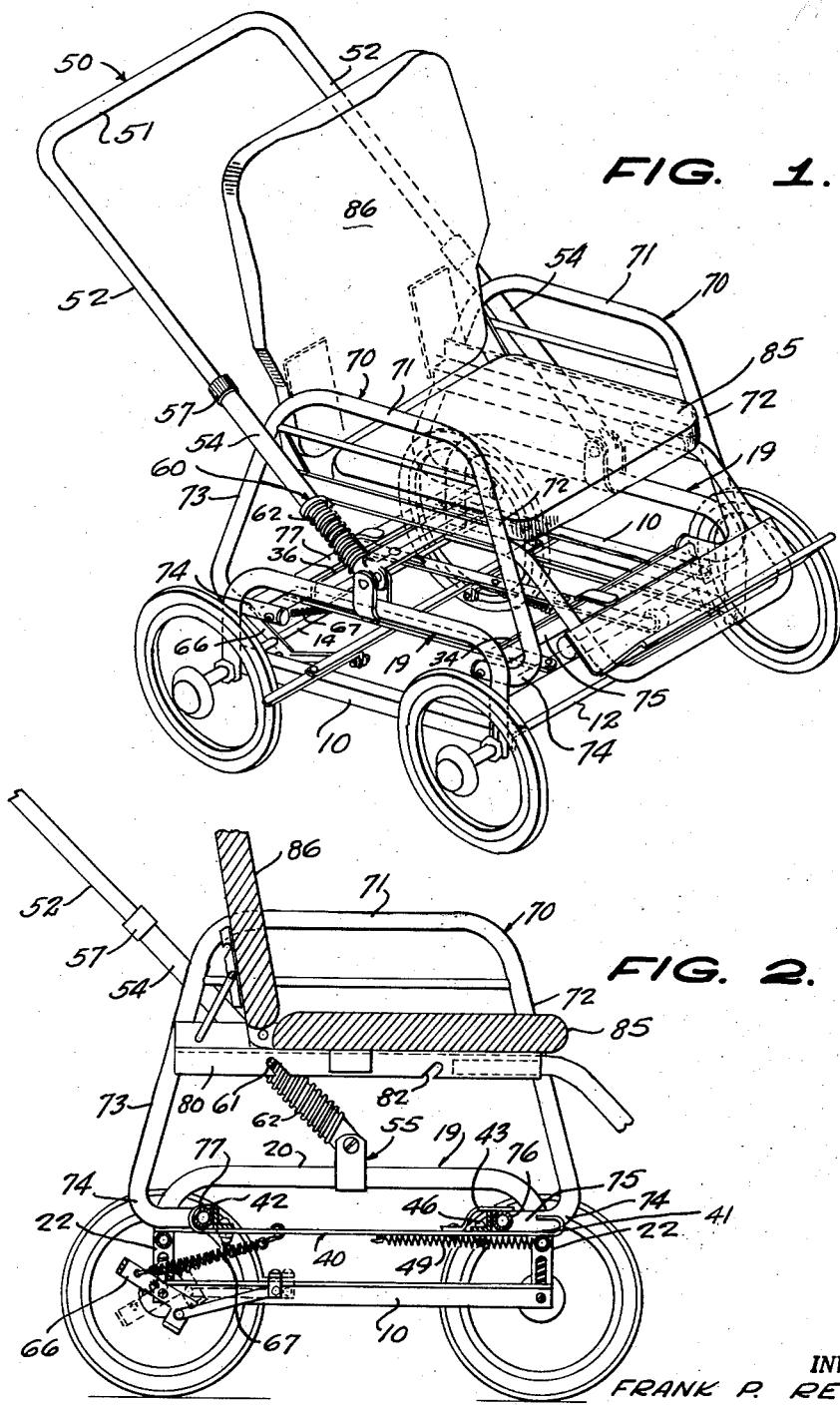

United States Patent Office 3,100,651
Patented Aug. 13, 1963

3,100,651
STROLLER CHASSIS CHILD'S SUPPORT
STRUCTURE
Frank P. Reese, Salt Lake City, Utah, assignor of onehalf to George Lynn Garff, Salt Lake City, Utah
Filed Sept. 29, 1961, Ser. No. 141,749
5 Claims. (Cl. 280—30)

This invention relates to a stroller chassis child's support structure.

An object of the present invention is to provide a stroller chassis which lends itself to ready mounting and dismounting thereon of a child's support structure.

Another object of the present invention is to provide a stroller chassis including a releasable latch means which lends itself for use when mounting upon and dismounting from a child's support structure.

A further object of the present invention is to provide a stroller chassis which includes a swingable handle releasably securable in any position of its swinging movement.

Other objects and advantages of the present invention will become apparent from the following description taken in conjunction with the accompanying drawings, in which:

FIGURE 1 is a perspective view of the support structure with the back, seat, and footboard unit, attached thereto and mounted upon a stroller type chassis according to the present invention.

FIGURE 2 is a side elevational view, with parts broken away, of the assembly of FIGURE 1.

FIGURE 3 is a perspective view of the chassis structure and the handle in lay-down position of the assembly of FIGURE 1, with the wheels shown in dotted lines.

FIGURE 4 is a plan view, with parts broken away and in section, of the structure of FIGURE 3.

FIGURE 5 is a fragmentary sectional view taken on the line 5—5 of FIGURE 3.

FIGURE 6 is a fragmentary view of the sleeve and handle connection indicated by the circled numeral 6 in FIGURE 3, with parts broken away and in section, and the nipple disconnected from the sleeve.

FIGURE 7 is a fragmentary view taken on the line 7—7 of FIGURE 3.

Referring to FIGURES 3 and 4, the stroller type chassis of the present invention comprises a pair of laterally-spaced side frame members 10, a front axle 12 extending transversely through and supported in the side frame members inwardly of and adjacent the forward ends of the frame members, and a rear axle 14 extending transversely through and supported in the side frame members inwardly of and adjacent the rearward ends of the side frame members. The front axle 12 has an end portion 16 projecting outwardly of each of the side frame members 10, and the rear axle 14 also has an end portion 18 projecting outwardly of each of the side frame members 10. An inverted U-shaped support 19 including a bight 20 and a pair of legs 22 projecting from the bight is disposed so that it extends from each of the end portions 16 of the front axle 12 to each of the end portions 18 of the rear axle 14, with the bight 20 parallel to and on the outer side of the adjacent side frame member 10 and having the legs 22 connected to the adjacent end portions 16 and 18 of the front and rear axles 12 and 14, respectively. A front ground-engaging wheel 21 is rotatably mounted on each of the end portions 16 of the front axle 12 outwardly of the supports 19, and a rear ground-engaging wheel 23 is rotatably mounted on each of the end portions 18 of the rear axle 14 outwardly of the supports 19. A forward crossbar 24 is spaced above and extends along the front axle 12 and has its ends attached to the adjacent legs 22 of the supports intermediate the ends thereof, and a rearward crossbar 26 is spaced above and extends along the rear axle 14 and has its ends attached to the adjacent legs 22 of the supports intermediate the ends thereof.

It is to be noted that each of the legs 22 of the supports 19 are resiliently connected to the adjacent end portion 16 or 18 of the front and rear axles 12 or 14. Specifically, as shown in FIGURE 5, a coil spring 29 is disposed within the part 25 of the leg 22 between the rearward crossbar 26 and the rear axle 14 and has its ends bearing against the crossbar 26 and the rear axle 14, the part 25 being provided with opposed slots 27 for inspection purposes.

A bed frame 30 is supported upon the forward and rearward crossbars 24 and 26 and is fixedly attached to the crossbars 24 and 26. The bed frame 30 includes a pair of side pieces 32 which extend from the forward crossbar 24 to the rearward crossbar 26 and have their ends fixedly secured to the crossbars 24 and 26, and a forward and a rearward cross piece 34 and 36 inwardly of and adjacent the forward and rearward crossbars 24 and 26, respectively, and attached to the side pieces 32. The bed frame is adapted to have mounted thereon the support structure of a child's convertible furniture article of the type illustrated in FIGURE 1, and which will be subsequently described.

A releasable latch means is provided on the bed frame 30 for releasably holding the support structure of a child's convertible furniture article when mounted on the bed frame 30. Specifically, this latch means comprises an elongated bar 40 having an arcuately-shaped finger 41 at the front end and a like arcuately-shaped finger 42 at the rear end, the fingers 41 and 42 facing toward each other. The bar 40 is also provided with a tongue 43 which is inwardly of and spaced from and faces toward the finger 41 and in the same direction as the finger 42. The bar 40 is disposed upon the bed frame 30 so that it extends between the side pieces 32 with the finger 41 at the outer side of the forward crosspiece 34 and the tongue 43 at the inner side of the forward crosspiece 34 and the finger 42 at the outer side of the rearward crosspiece 36. Means connects the bar 40 to the forward and rearward crosspieces 34 and 36 for limited movement of the finger 42 and tongue 43 toward and away from the crosspieces 36 and 34, respectively. Specifically, this means comprises a first pin 44 carried by the front crosspiece 34 which is slidably engaged by a first closed slot 45 formed in the bar 40 between the finger 41 and the tongue 43, and a second pin 46 carried by the rearward crosspiece 36 which is slidably engaged by a second closed slot 47 formed in the bar 40 inwardly of and adjacent the finger 42. The slot 45 at the end adjacent the finger 41 has a branch 48 normal to the slot 45, this branch 48 receiving the first pin 44 when the bar 40 has executed the movement which shifts the finger 42 away from the crosspiece 36 and the tongue 43 away from the crosspiece 34 and the bar 40 has been shifted laterally to permit the first pin 44 to enter the branch 48 to thereby releasably hold the bar in the position in which the finger 42 and tongue 43 are away from the crosspieces 36 and 34, respectively. Spring means in the form of a coil spring 49 is operatively connected to the bar 40 and the rearward crossbar 26, the spring means functioning to bias the bar 40 so that the finger 42 and tongue 43 are toward the crosspieces 36 and 34, respectively.

A U-shaped handle is provided which is indicated generally by the numeral 50, the handle including a bight 51 and a pair of legs 52 projecting from the bight 51. Means connects the handle to the bight 20 of the supports 19 for swinging movement between a position overlying the bed frame 30 to a sloping position leaning toward the forward crossbar 24 or the rearward crossbar 26. Specifically, said means comprises an open-ended sleeve 54 disposed with respect to each of the bights 20 of the supports 19 so as to extend along and over-lie the adjacent bight, and a pivot means 55 supported on each of the bights 20 of the supports 19 connects the sleeve 54 adjacent one end to the bights 20 for swinging movement from the overlying position to a sloping position leaning toward the forward crossbar 24 or the rearward crossbar 26. The legs 52 of the handle 50 extend slidably into the sleeves 54 through the other ends thereof, and are mounted in the sleeves for projectile and contractile movements through the one end of the sleeves 54.

Detachable cooperating securing means is provided on the sleeves 54 and the legs 52 of the handle 50 for fixedly holding the legs 52 to the sleeves 54 in any selected position of their projectile and contractile movements out of and into the one ends of the sleeves 54. Such means comprises a split fibre bushing 56 circumposed about each of the legs 52 of the handle 50 and slidable along said legs, and a nipple 57 slidable on each of the legs 52 of the handle 50 and threadedly engageable with the other end of the adjacent sleeve 54. When the legs 52 of the handle 50 have been projected out of or contracted into the said one ends of the sleeves 54 to the desired extent, the bushings 56 on the legs 52 are slid along the legs until they are contiguous to the other ends of the sleeves 54, the nipples 57 are next slid along the legs 52 until they completely shroud the bushings and then the nipples 57 are screwed onto the other ends of the sleeves 54 until they are in tight engagement with the sleeves, resulting in the bushings 56 causing the nipples 57 to fixedly hold the legs 52 to the sleeves 54.

Holding means, indicated generally by the numeral 60, is carried by the sleeves 54, and comprises a spring-biased rod 61 extending transversely of and carried by the sleeves 54. Specifically, a coil spring 62 is circumposed about and is slidable along each sleeve 54, and the opposed ends of the rods 61 are also slidable along the sleeves 54 and engage the ends of the coil spring 62 remote from the said one end of the sleeves when the rod 61 is shifted into position for use of the holding means which will be subsequently described.

The chassis of the present invention includes a brake which is movable into and out of simultaneous engagement with the front portions of the rear wheels 23. Specifically, the brake comprises a bar member 65 projecting transversely from each of the side frame members 10 and located forwardly of and contiguous to the rear wheels 23, the bar members being connected to the side frame members 10 for simultaneous movement into and out of engagement with the front portions of the rear wheels 23. Foot actuable means 66 is operatively connected to the bar members 65 and the rear axle 14 for effecting the movements of the bar members 65 into and out of engagement with the front portions of the rear wheels 23. Spring means in the form of a coil spring 67 is operatively connected to the foot actuable means 66 and the bed frame 30 for urging the bar members 65 to the position out of engagement with the front portions of the rear wheels 23.

Reverting to FIGURES 1 and 2, it will be observed that on the stroller type chassis as above described and specifically shown in FIGURES 3 and 4, there is mounted the support structure of a child's convertible furniture atricle. The support structure comprises a pair of upstanding leg members 70 arranged in lateral spaced relation, each of the leg members 70 having a horizontal top portion 71, a front portion 72 sloping downwardly and outwardly from the forward end of the top portion 71, a rear portion 73 sloping downwardly and outwardly from the rear end of the top portion 71, and a bend portion 74 having one end merging with the lower end of each of the front and rear portions 72 and 73. The other ends of the bend portions 74 extend toward and are spaced from each other, and a horizontal portion 75 is arranged so as to extend linearly from the other end of each of the bend portions 74 and has one end merging into the other end of the bend portion. A first rigid elongated bar member 76 connects the other ends of the bend portions 74 adjacent the front portion 72 of the leg members 70 together. A second rigid elongated bar member 77 connects the other ends of the bend portions 74 adjacent the rear portions 73 of the leg members 70 together.

A fixed ledge 80 is carried by and extends from the front portions 72 to the rear portions 73 of the leg members 70 between the top portions 71 and the horizontal portions 75, the ledges 80 facing each other. Each of the ledges 80 has two angular slots 81 and 82 spaced from each other, the slot 81 sloping upwardly toward the rear portion 73 and the slot 82 sloping upwardly toward the front portion 72. A seat 85 is positioned between the leg members 70 so that the under face rests upon the ledges 80. A back 86 is positioned between the leg members 70 so that it extends in an upright direction toward the rear portion 73 of the leg members 70.

To mount the thus-described support structure upon the stroller chassis, the latch bar 40 is caused to execute its movement so that the finger 42 and tongue 43 are in the positions away from the crosspieces 36 and 34 respectively, of the bed frame 30. This is effected by applying an inwardly-directed force to the finger 41 sufficient to cause the bar 40 to move backwardly to its fullest extent permitted by the slots 45 and 47 against the action of the spring 49, whereupon the bar 40 is shifted laterally to permit the first pin 44 to enter the branch 48 of the slot 45. The support structure is next positioned so that the bend portions 74 adjacent the front portions 72 of the leg members 70 rest upon the forward crossbar 24 with the first bar member 76 resting upon the portions of the side pieces 32 of the bed frame 30 between the forward crosspiece 34 and the forward crossbar 24 and between the tongue 43 and the finger 41 of the bar 40, and the bend portions 74 adjacent the rear portions 73 of the leg members rest upon the rearward crossbar 26 with a second bar member 77 resting upon the portions of the side pieces 32 of the bed frame 30 between the rearward crosspiece 36 and the rearward crossbar 26 and forwardly of the finger 42 of the bar 40. With the support structure thus mounted, the bar is shifted laterally to permit the first pin 44 to move out of the branch 48 into the slot 45, whereupon the bar 40 is released, permitting the tongue 43 and the finger 42 of the bar 40, under the action of the spring 49, to overlie and engage the bar members 76 and 77, respectively.

As shown in FIGURES 3 and 4, the handle 50 and the sleeves 54 are in the overlying position with respect to the bights 20 of the supports 19 and the legs 52 of the handle 50 have executed their full projectile movement out of the one ends of the sleeves 54. To shift the handle 50 from the overlying position to the position in which the sleeves 54 are in the sloping position leaning toward the rearward crossbar 26, or the position of FIGURE 1, the nipples 57 are released from threaded engagement with the other ends of the sleeves 54, and then an outwardly-directed force is applied to the bight 51 of the handle 50 sufficient to project the legs 52 out of the other ends of the sleeves 54 to the desired extent, whereupon the handle 50 and the sleeves 54 are swung upwardly about the pivot means 55 until the rod 61 is seated in the slot 81 in the ledges 80, thereby holding the handle in the sloping position leaning toward the rearward crossbar 26.

The slots 82 are for seating the rod 61 therein when the handle 50 has been swung to the sloping position leaning toward the forward crossbar 24.

What is claimed is:

1. In a child's convertible article of manufacture, a stroller-type chassis comprising a pair of laterally-spaced side frame members, a front axle extending transversely through and supported in the side frame members inwardly of and adjacent the forward ends of the side frame members and having an end portion projecting outwardly of each of the side frame members, a rear axle extending transversely through and supported in the side frame members inwardly of and adjacent the rearward ends of the side frame members and having an end portion projecting outwardly of each of the side frame members, a front ground-engaging wheel rotatably mounted on each of the projecting end portions of said front axle, a rear ground-engaging wheel rotatably mounted on each of the projecting end portions of said rear axle, a pair of inverted U-shaped supports each including a bight and a pair of legs projecting from the bight, each support being disposed so that it extends from each of the end portions of the front axle to each of the end portions of the rear axle with the bight parallel to and on the outer side of the adjacent side frame member and having the legs connected to the adjacent end portions of the front and rear axles, a forward crossbar spaced above and extending along said front axle and having its ends attached to the adjacent legs of said support intermediate their ends thereof, a rearward crossbar spaced above and extending along said rear axle and having its ends attached to the adjacent legs of said support intermediate their ends thereof, a bed frame fixedly supported upon said forward and rearward crossbars, said bed frame including a pair of side pieces extending from said forward crossbar to said rearward crossbar and having their ends secured to said crossbars, and a forward and a rearward crosspiece inwardly of and adjacent the forward and rearward crossbars and attached to said side pieces, and a releasable latch means operatively connected to the forward and rearward crosspieces of said bed frame for releasably holding the support structure of a child's convertible furniture article when mounted on said bed, said latch means including an elongated bar having a tongue inwardly of and adjacent the front end thereof and having an arcuately-shaped finger at the rear end, the tongue and finger facing in the same direction, said bar being disposed so that it extends between the side pieces of said bed frame with the tongue at the inner side of the forward crosspiece and the finger at the outer side of the rearward crosspiece, and means connecting said bar to said forward and rearward crosspieces for limited movement of the finger and tongue toward and away from said rearward and forward crosspieces respectively.

2. In a child's convertible article of manufacture, a stroller-type chassis comprising a pair of laterally-spaced side frame members, a front axle extending transversely through and supported in the side frame members inwardly of and adjacent the forward ends of the side frame members and having an end portion projecting outwardly of each of the side frame members, a rear axle extending transversely through and supported in the side frame members inwardly of and adjacent the rearward ends of the side frame members and having an end portion projecting outwardly of each of the side frame members, a front ground-engaging wheel rotatably mounted on each of the projecting end portions of said front axle, a rear ground-engaging wheel rotatably mounted on each of the projecting end portions of said rear axle, a pair of inverted U-shaped supports each including a bight and a pair of legs projecting from the bight, said support being disposed so that it extends from each of the end portions of the front axle to each of the end portions of the rear axle with the bight parallel to and on the outer side of the adjacent side frame member and having the legs connected to the adjacent end portions of the front and rear axles, a forward crossbar spaced above and extending along said front axle and having its ends attached to the adjacent legs of said support intermediate their ends thereof, a rearward crossbar spaced above and extending along said rear axle and having its ends attached to the adjacent legs of said support intermediate their ends thereof, a bed frame fixedly supported upon said forward and rearward crossbars, said bed frame including a pair of side pieces extending from said forward crossbar to said rearward crossbar and having their ends secured to said crossbars, and a forward and a rearward crosspiece inwardly of and adjacent the forward and rearward crossbars and attached to said side pieces, and a releasble latch means operatively connected to the forward and rearward crosspieces of said bed frame for releasably holding the support structure of a child's convertible furniture article when mounted on said bed frame, said latch means including an elongated bar having a tongue inwardly of and adjacent the front end thereof and having an arcuately-shaped finger at the rear end, the tongue and finger facing in the same direction, said bar being disposed so that it extends between the side pieces of said bed frame with the tongue at the inner side of the forward crosspiece and the finger at the outer side of the rearward crosspiece, means connecting said bar to said forward and rearward crosspieces for limited movement of the finger and tongue toward and away from said rearward and forward crosspieces respectively, and means on said bar and releasably engageable with said connecting means of said forward crosspiece for holding said bar in the position in which said finger and tongue are away from the rearward and forward crosspieces respectively.

3. The structure according to claim 2, which includes in addition spring means operatively connected to said bar and said rearward crossbar for biasing said bar in the position in which said finger and tongue are toward the rearward and forward crosspieces.

4. In a child's convertible article of manufacture, a stroller type chassis comprising a pair of laterally-spaced side frame members, a front axle extending transversely through and supported in the side frame members inwardly of and adjacent the forward ends of the side frame members and having an end portion projecting outwardly of each of the side frame members, a rear axle extending transversely through and supported in the side frame members inwardly of and adjacent the rearward ends of the side frame members and having an end portion projecting outwardly of each of the side frame members, a front ground-engaging wheel rotatably mounted on each of the projecting end portions of said front axle, a rear ground-engaging wheel rotatably mounted on each of the projecting end portions of said rear axle, a pair of inverted U-shaped supports each including a bight and a pair of legs projecting from the bight, each support being disposed so that it extends from each of the end portions of the front axle to each of the end portions of the rear axle with the bight parallel to and on the outer side of the adjacent side frame member and having the legs connected to the adjacent end portions of the front and rear axles, a forward crossbar spaced above and extending along said front axle and having its ends attached to the adjacent legs of said supports intermediate their ends thereof, a rearward crossbar spaced above and extending along said rear axle and having its ends attached to the adjacent legs of said support intermediate their ends thereof, a bed frame fixedly supported upon said forward and rearward crossbars, said bed frame including a pair of side pieces extending from said forward crossbar to said rearward crossbar and having their ends secured to said crossbars, and a forward and rearward crosspiece inwardly of and adjacent the forward and rearward crossbars and attached to said side pieces, a support structure comprising a pair of upstanding leg members arranged in lateral spaced relation, each of said leg members having a horizontal top portion, a front portion sloping downwardly and outwardly from the forward end of said top portion, a rear portion sloping downwardly and outwardly from the rear end of said top portion, a bend portion having one end merging with the lower end of each of said front and rear portions, the other ends of said bend portions extending toward and spaced from each other, and a horizontal portion arranged so as to extend linearly from the other end of each bend portion and having one end merging with the other end of the bend portion, a first bar member connecting the other ends of the bend portions adjacent the front portions of said leg members together, a second bar member connecting the other ends of the bend portions adjacent said rear portions of said leg members together, said support structure being mounted upon said chassis so that the bend portions adjacent the front portions of the leg members rest upon said forward crossbar with the first bar member resting upon the portions of the side pieces of said bed frame between the forward crosspiece and the forward crossbar, and the bend portions adjacent the rear portions of the leg members resting upon the rearward crossbar with the second bar member resting upon the portions of the side pieces of said bed frame between the rearward crosspiece and the rearward crossbar, and releasable latch means slidably mounted on the crosspieces of said frame and provided with spaced means embodying a finger and a tongue adapted to overlie and engage said first and second bar members when the latter members are in the aforesaid mounted position.

5. The structure according to claim 4, wherein said releasable latch means comprises an elongated bar slidably mounted on the crosspieces of said frame and provided with a finger and a tongue in spaced relation therealong with said bar being shiftable so as to overlie and engage said first and second bar members to thereby hold the support structure on said chassis.

References Cited in the file of this patent
UNITED STATES PATENTS

| | | |
|---|---|---|
| 2,410,797 | Allenbaugh | Nov. 12, 1946 |
| 2,512,995 | Berger | June 27, 1950 |
| 2,686,077 | Upton | Aug. 10, 1954 |
| 2,968,338 | Reese | Jan. 17, 1961 |
| 2,982,562 | Gladstein | May 2, 1961 |